(12) United States Patent  
Chen et al.

(10) Patent No.: US 11,650,550 B2  
(45) Date of Patent: May 16, 2023

(54) CONTROL SYSTEM, CONTROL METHOD AND COMPUTER STORAGE MEDIUM

(71) Applicant: The Chinese University of Hong Kong, Hong Kong (CN)

(72) Inventors: Shih-Chi Chen, Hong Kong (CN); XiangBo Liu, Hong Kong (CN); Chenglin Li, Hong Kong (CN); Xiaogang Wang, Hong Kong (CN); Hongsheng Li, Hong Kong (CN)

(73) Assignee: The Chinese University of Hong Kong, Hong Kong (CN)

(*) Notice: Subject to any disclaimer, the term of this patent is extended or adjusted under 35 U.S.C. 154(b) by 1029 days.

(21) Appl. No.: 16/419,955

(22) Filed: May 22, 2019

(65) Prior Publication Data

US 2020/0371481 A1    Nov. 26, 2020

(51) Int. Cl.
    *G05B 13/00*      (2006.01)
    *G05B 13/02*      (2006.01)
    *G06N 3/04*      (2023.01)

(52) U.S. Cl.
    CPC ......... *G05B 13/027* (2013.01); *G06N 3/0445* (2013.01); *G06N 3/0454* (2013.01)

(58) Field of Classification Search
    CPC ... G05B 13/027; G06N 3/0445; G06N 3/0454
    See application file for complete search history.

(56) References Cited

U.S. PATENT DOCUMENTS

| | | | |
|---|---|---|---|
| 2019/0209022 A1* | 7/2019 | Sobol | A61B 5/0022 |
| 2019/0227528 A1* | 7/2019 | Abbott | G05B 19/4155 |
| 2019/0258962 A1* | 8/2019 | Sreekumari | G06N 20/10 |
| 2021/0064998 A1* | 3/2021 | Cheng | G06K 9/6271 |
| 2021/0287040 A1* | 9/2021 | Al-Qunaieer | G06V 10/25 |
| 2022/0188646 A1* | 6/2022 | Ramesh | G06N 3/088 |

* cited by examiner

*Primary Examiner* — Joseph C Rodriguez
(74) *Attorney, Agent, or Firm* — Schwegman Lundberg & Woessner, P.A.

(57) ABSTRACT

In some embodiments, a control system, a control method and a storage medium are provided. In the method, first motion information of a machine acquired by a first sensor is received; the first motion information is inputted into a deep learning model to obtain a model output, the deep learning model comprising a convolutional neural network (CNN) and a long short-term memory (LSTM); the deep learning model is trained using the first motion information and second motion information acquired by a second sensor; the first sensor and the second sensor having different ways of detecting information and processing the detected information. The model output is used to control the machine.

18 Claims, 7 Drawing Sheets

CONTROL SYSTEM, CONTROL METHOD AND COMPUTER STORAGE MEDIUM

TECHNICAL FIELD

Embodiments of the present disclosure relate generally to the field of control technology. More particularly, embodiments of the disclosure relate to a control system, a control method and a storage medium.

BACKGROUND

Positioning technologies are important as they set limits on manufacturing and metrology precision. At present, positioners and manufacturing methods achieve submicron level precision, e.g., air-bearing stages (100 nm repeatability) or flexure-based piezoelectric nanopositioners (10 nm repeatability), by exploiting the precision engineering principles and high repeatability, high precision components (e.g., sensors and actuators) with proper control methods. However, the cost of these high performance solutions limits their practical applications in industrial, manufacturing and assembly processes.

SUMMARY

In an aspect of the disclosure, a control system is provided. The system includes a processor and a memory coupled to the processor to store instructions, the instructions when executed by the processor, causing the processor to perform operations, the operations including: receiving first motion information of a machine, the first motion information being acquired by a first sensor; inputting the first motion information into a deep learning model to obtain a model output, the deep learning model including a convolutional neural network (CNN) and a long short-term memory (LSTM), the deep learning model being trained using the first motion information and second motion information of the machine collected by a second sensor, and the first sensor and the second sensor having different ways of detecting information and processing the detected information; and using the model output to control the machine.

In another aspect of the disclosure, a control method is provided. In the control method, first motion information of a machine is received, the first motion information being acquired by a first sensor; the first motion information is inputted into a deep learning model to obtain a model output, the deep learning model including a convolutional neural network (CNN) and a long short-term memory (LSTM), the deep learning model being trained using the first motion information and second motion information of the machine collected by a second sensor, and the first sensor and the second sensor having different ways of detecting information and processing the detected information, and the model output is used to control the machine.

In another aspect of the disclosure, a non-transitory machine-readable medium having instructions stored therein is provided. The instructions, when executed by a processor, cause the processor to perform operations, the operations including: receiving first motion information of a machine, the first motion information being acquired by a first sensor; inputting the first motion into a deep learning model to obtain a model output, the deep learning model including a convolutional neural network (CNN) and a long short-term memory (LSTM), the deep learning model being trained using the first motion information and second motion information acquired by a second sensor, and the first sensor and the second sensor having different ways of detecting information and processing the detected information; and using the model output to control the machine.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
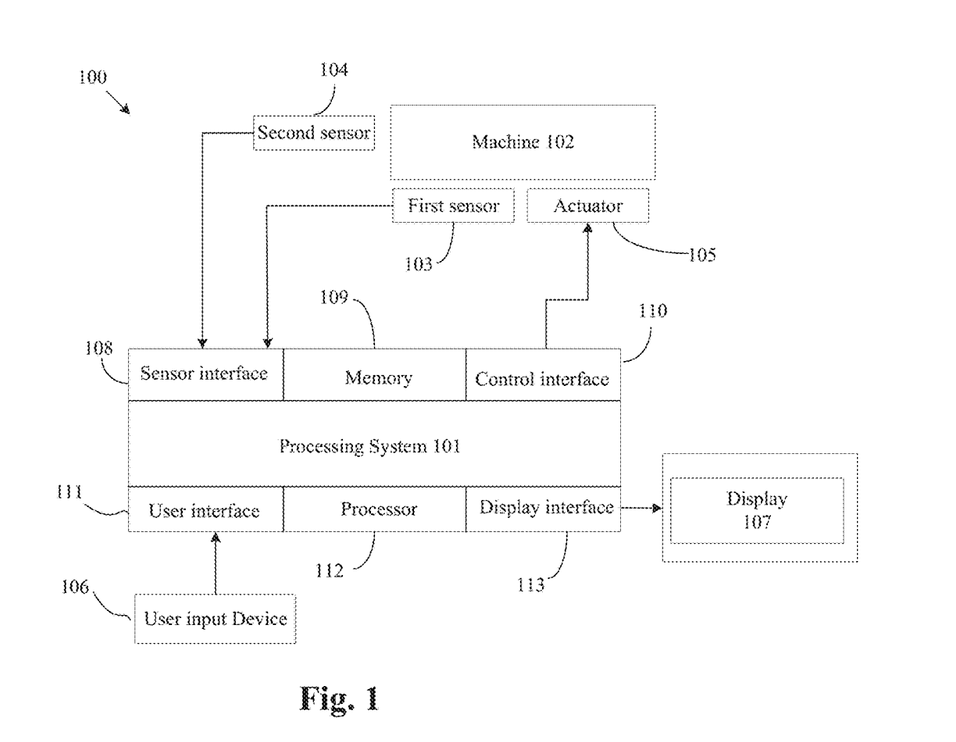
FIG. 1 is a block diagram illustrating a control system according to some embodiments of the disclosure.

Referring to FIG. 1, a control system 100 is provided according to some embodiments. In some embodiments, the control system 100 includes a processing system 101, a plurality of first sensors 103 (e.g., sensor array) and a plurality of second sensors 104 (e.g., reference sensor). In some embodiments, the second sensors 104 have comparable resolution and repeatability with the first sensors 103. In some embodiments, the second sensors 104 may have a higher resolution than the first sensors 103. The resolution of a sensor is the smallest change it can detect in the quantity that it is measuring. The second sensor and the first sensor have different ways of detecting information and processing the detected information, e.g., detecting motion via mechanical strain or capacitance variation. The first sensors 103 are configured to collect a first state of machine 102. In some embodiments, the first sensors 103 include strain gauges, strain probes, or capacitive strain sensors, etc., and the first state includes strain, speed and load, etc. In some embodiments, the strain gauges are optical gauges, semiconductor gauges or metal-based gauges. The second sensors 104 are configured to collect a second state of machine 202. In some embodiments, the second sensors 104 include capacitance probes or laser interferometers, and the second state includes position, and shape, etc.

In some embodiments, one or more actuators 105 are controlled directly or indirectly by the processing system 101.

In some embodiments, the processing system 101 includes at least one processor 112, a memory 109, a sensor interface 108, and a control interface 110. In some embodiments, the processing system 111 further includes a user input interface 111, a display interface 113, and other features known in the art. In some embodiments, the processor 112 is any type of central processing unit (CPU), including a microprocessor, a digital signal processor (DSP), a microcontroller, an application specific integrated circuit (ASIC), a field programmable gate array (FPGA), or the like. In some embodiments, the memory 109 may include random access memory (RAM), read only memory (ROM), or other electronic, optical, magnetic, or any other computer readable medium onto which data and algorithms are stored as executable instructions in a non-transitory form.

In some embodiments, the first sensors 103 are arranged all over the machine such that each of the first sensor emulates a pixel in an image of the machine. In some embodiments, the first sensors are arranged at flexing portions of the machine, the flexing portion having higher strains when the machine operates.

In some embodiments, the user input interface 111 acquires a user input from one or more user input devices 106, such as keys, buttons, scroll wheels, touchpad, mouse input, and the like. In some embodiments, the user input device 106 is integrated with the display 107, such as a touch screen.

Figure 2:
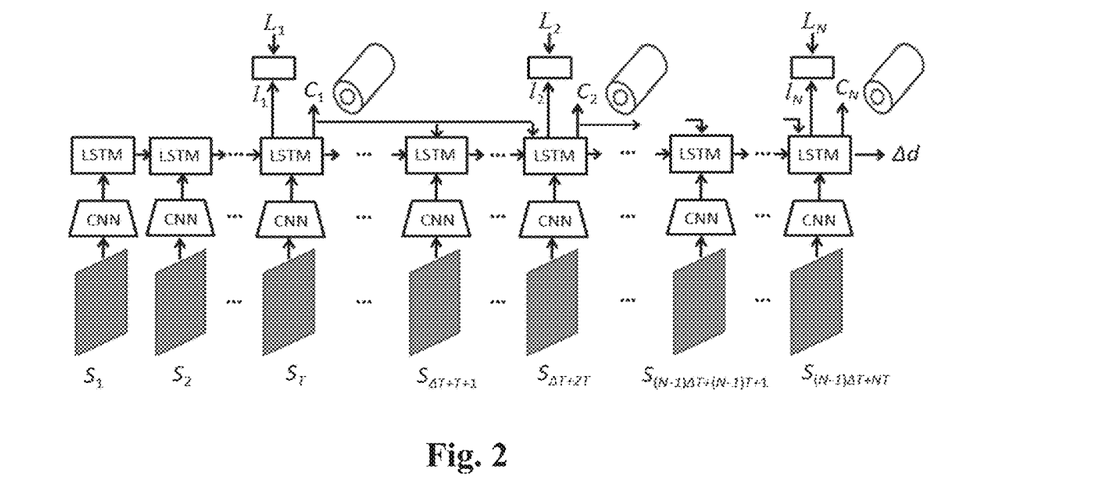
FIG. 2 is a schematic diagram illustrating using and training a deep learning model according to some embodiments of the disclosure.

FIG. 2 illustrates a schematic diagram of using and training a deep learning model according to some embodiments of the disclosure.

In some embodiments, the deep learning model includes a convolutional neural network (CNN) and a long short-term memory network (LSTM) as shown in FIG. 2. In some embodiments, the mechanical strains as well as other information, e.g., speed and load, from the sensor array are collected at high speed (1 to 100 kHz), forming input sequences of the deep learning model.

As shown in FIG. 2, {S1 to St} is a sequence of data collected at different time points from the first sensor as inputs. In some embodiments, the frequency of the original data sequence is high, and the data need to be sampled to balance the computation cost and the control accuracy. According to the embodiments of the disclosure, instead of using the deep learning model to predict compensation of position errors in a single time step, the deep learning model drives actuators in multiple time steps to generate smooth and accurate motion. As the target position error is only measured at the last stage during training, reinforcement learning is employed to train the neural networks in the intermediate stages through the design of reward functions.

As shown in FIG. 2, the control is divided into N stages each including T time steps for collecting the inputs, and $\{C_1$ to $C_n\}$ is a predicted sequence of control. Each $C_n$ is predicted in the $n^{th}$ stage based on the data from T time steps in the $n^{th}$ stage as well as the control signal $C_{n-1}$ from $(n-1)^{th}$ stage. $C_n$ changes the state of the machine, so that states of sensors as well as the environment after time $(n-1)\Delta T+nT$ are changed and new data are sampled. LSTM in the $n^{th}$ stage takes features from CNN as well as the control signal $C_{n-1}$ from the $(n-1)^{th}$ stage as inputs. In some embodiments, $\Delta T$ between two consecutive stages is negative, and the data samples from two successive overlapping stages. If $\Delta T=-T+1$, the deep learning model makes control at every time step. As sensor arrays have spatial structures, CNN is used to extract features from St. The features extracted at multiple time steps are aggregated by LSTM to make prediction at the last time step of each stage. LSTM has various gating functions to automatically decide which samples from different time steps are memorized or forgotten. In some embodiments, the position error $\Delta d$ is measured with second sensors at the training stage. The ultimate goal is to train the deep model to minimize $\Delta d$. $\Delta d$ guides the training of CNN and LSTM through the reward function in reinforcement learning. To further improve the effectiveness of training, expensive second sensors are placed to measure the position Ln at each stage. At each stage, the LSTM also predicts positions ln, and Ln is used as additional supervision to revise the reward function for training.

In some embodiments, the CNN includes two convolutional layers with 3×3 kernels, and outputs the feature representation of a given input. In some embodiments, the CNN includes N shared sub-CNNs corresponding to respective N stages, and the LSTM includes N LSTM cells corresponding to respective N stages. An LSTM cell takes in the given feature generated by the CNN (e.g., 64-dimensional vector) at the $n^{th}$ stage and the cell state (e.g., 64-dimensional vector) at $(n-1)^{th}$ stage, and calculates the output feature (e.g., 64-dimensional vector) and cell state (e.g., 64-dimensional vector) at $n^{th}$ stage by a fully-connected layer. Thus, the temporal characteristics are maintained by calculating the cell state at every stage. In some embodiments, all N sub-CNNs corresponding to the N stages has the same structure and shared network weights, and all LSTM cells corresponding to the N stages have the same structure and share network weights.

In some embodiments, the reward function is designed to guide the control system to accomplish the given task, that is, to achieve the target position. The smaller the difference between current position $p_t$ and target position $p_T$ is, the larger reward the control system gets. In addition, in some embodiments, a punishment term for system stability is fed back when current position exceeds the target position. The reward function is formulated with a manually set hyper-parameter λ as:

$$-\|p_t - p_T\|^2 + \lambda \max(0, p_t - p_T)^2 \qquad (1)$$

In some embodiments, for training the whole neural networks with reinforcement learning, a two-stage training strategy is adopted. At the first stage, the deep learning model is pre-trained using the collected sequence data through a conventional auto-control system method. With these data, it is not necessary to search among all probabilistic actions via generating a signal sampled from the machine at the early stage of training the deep learning model and thus avoid damaging the machine when the deep learning model is not well initialized. At the second stage, the deep learning model is trained by measuring the reward function values from the signals randomly sampled from the machine and following the guidance of the reward function. After training, the model can perform precisely and efficiently in any potential test environment. After training, the deep learning model can generate proper control signals by given input only from low-cost sensors. To further improve the training, the second sensors (e.g., high cost sensors) are placed when the deep learning model is trained to detect the positions of machines, which are used to generate the reward functions values in reinforcement learning.

In some embodiments, a physical model established based on physical knowledge is integrated with the deep learning model. In some embodiments, the physical knowledge includes engineering models, e.g., theory of elasticity, kinematics etc., With the engineering model, many displacement/load relationships are known to have deterministic relationships, e.g., for a cantilever beam, the strain at the base is proportional to $3EI/L^3$, where E is the modulus, I is the second moment of inertia (determined by the cross-section geometry of the beam), and L is the length of the beam. Thus, with the engineering model, the displacement and load relationship of any complex mechanical system does not need to be "learned" through many trainings. As such, by including the known relationship in the deep learning model, the total training and learning time and be reduced. Most mechanical systems are governed by the theories of statics, dynamics, mechanics of materials, kinematics, and heat transfer etc., which can be used to improve the deep learning model depending on the field of application.

In some embodiments, front-end installation of the deep learning models on machines is performed in the manufacturing platforms, and the deep learning model needs to be compact with low power consumption. Moreover, the speed needs to be high for real-time online control. In some embodiments, with the "build-in physical knowledge", the physical deep learning model predicts multiple measurements which are used as additional supervision for the deep neural networks. The feature representations of intermediate layers of neural networks contain much high-level semantic information. For example, the feature representations may contain the semantic direction of the given object state. The physics-guided deep learning model utilize additional supervision by predicting whether the object moves along the expected direction, such that, the learning process is more effective than treating the neural networks as black boxes, which usually requires many more neurons to approximate the nonlinear mapping functions.

In some embodiments, the technology of knowledge distilling is employed to compress the deep neural networks. A large network, which is easier to converge to a good local minimum than a smaller one, is trained. Then, the feature representations of the large network are used as supervision to train a small network via a backpropagation, and such supervision is more effective on training the deep model than position errors at the output layer. The large network is also automatically sparsified by automatically removing redundant neurons after convergence.

In some embodiments, a large number of high-sensitivity low-cost sensors (i.e., first sensors) are placed in the manufacturing platform, and therefore the deep learning model has many input channels. Through an optimization process, the input channels are automatically removed as many as possible without sacrificing the control accuracy. As such, an optimal configuration of sensor placement is obtained and the cost of the manufacturing platform are also reduced substantially.

Figure 3:
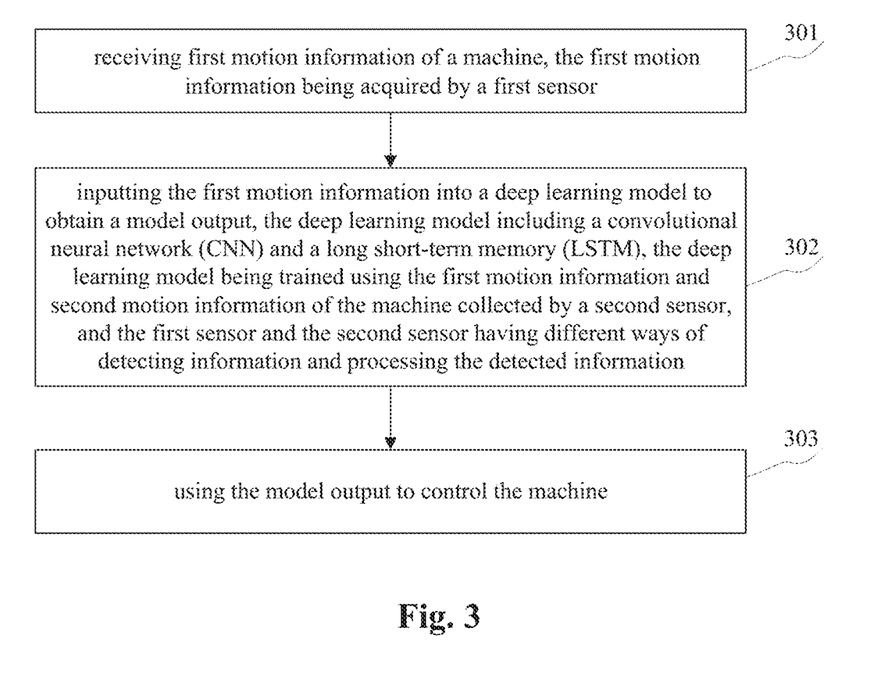
FIG. 3 is a flow chart of a method for controlling a machine according to some embodiments of the disclosure.

FIG. 3 is a flow chart of a method for controlling a machine according to some embodiments of the disclosure. The control method includes steps 301 to 303.

Step 301 includes: receiving first motion information of a machine, the first motion information being acquired by a first sensor.

Step 302 includes: inputting the first motion information into a deep learning model to obtain a model output, the deep learning model comprising a convolutional neural network (CNN) and a long short-term memory (LSTM), the deep learning model being trained using the first motion information and second motion information of the machine collected by a second sensor, and the first sensor and the second sensor having different ways of detecting information and processing the detected information.

In some embodiments, the model output is a first state of the machine, and the second motion information is a second state of the machine, a difference between the first state and the second state is used to train the deep learning model using reinforcement learning.

Step 303 includes: using the model output to control the machine.

In some embodiments, the processing system controls an actuator to move the machine according to the model output.

Figure 4:
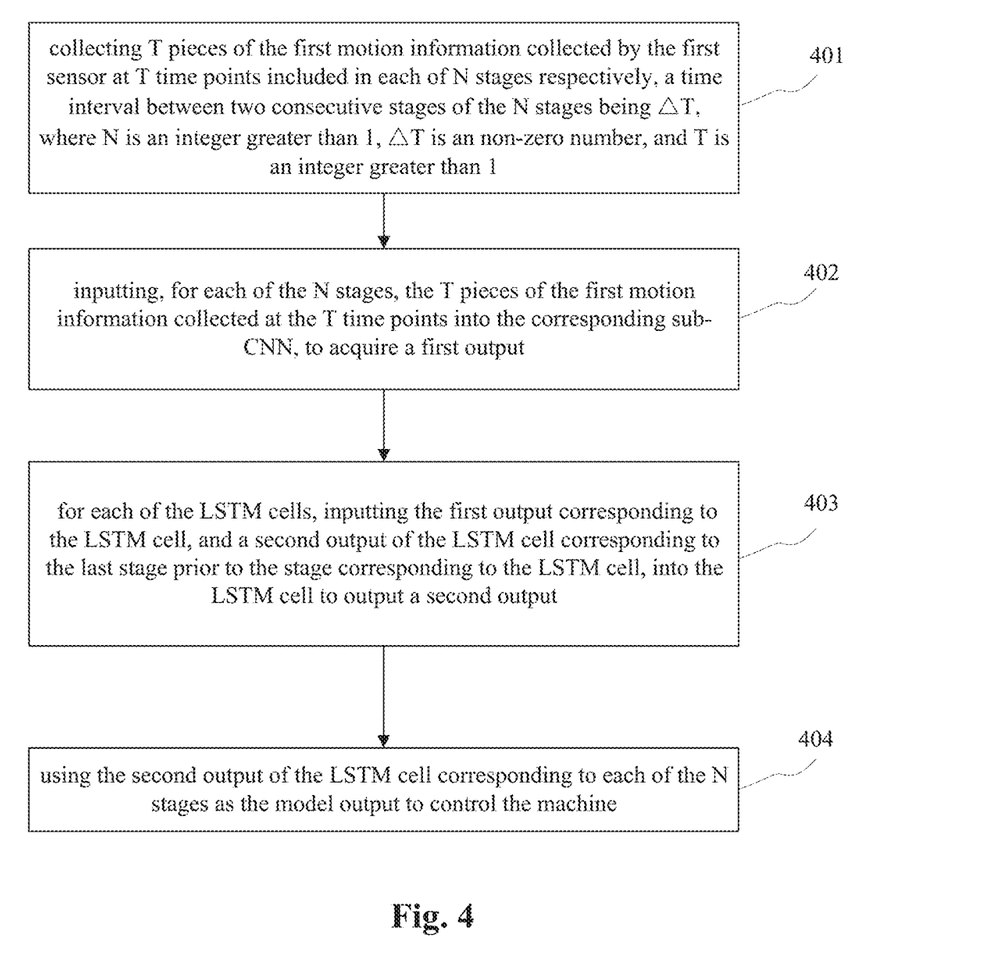
FIG. 4 is a flow chart of a method for controlling a machine according to other embodiments of the disclosure.

FIG. 4 is a flow chart of a method for controlling a machine according to other embodiments of the disclosure.

In some embodiments, the CNN comprises N sub-CNNs corresponding to the N stages, and the LSTM comprises N LSTM cells corresponding to the N stages. Each of the sub-CNNs is configured to receive T pieces of the first motion information collected at T time points in the stage corresponding to the sub-CNN, and outputs a first output; and each of the LSTM cells is configured to receive the first output of the sub-CNN corresponding to the LSTM cell, and a second output of the LSTM cell corresponding to the last stage prior to the stage corresponding to the LSTM cell, and to output a second output.

In some embodiments, the sub-CNN comprises T CNN portions corresponding to the T time points, and the LSTM cell comprises T LSTM portions corresponding to the T time points. Each of the CNN portions is configured to receive the piece of the first motion information collected at the time point corresponding to the CNN portion and output a first output corresponding to the received piece; and each of the LSTM portions is configured to receive the first output of the CNN portion, a second output of the LSTM portion corresponding to the last time point prior to the time point corresponding to the LSTM portion, and a second output of the LSTM portion corresponding to the last time point of the last stage prior to the stage corresponding to the LSTM portion, and to output a second output. In some embodiments, the control method includes steps 401 to 404.

Step 401 includes: collecting T pieces of the first motion information collected by the first sensor at T time points included in each of N stages respectively, a time interval between two consecutive stages of the N stages being ΔT, where N is an integer greater than 1, ΔT is an non-zero number, and T is an integer greater than 1.

In some embodiments, the deep learning model shown in FIG. 2 is used to control the machine.

Step 402 includes: inputting, for each of the N stages, the T pieces of the first motion information collected at the T time points into the corresponding sub-CNN, to acquire a first output;

In some embodiments, the collected T pieces of the first motion information are input into respective CNN portions of the sub-CNN corresponding to each stage as shown in FIG. 2 to acquire the first output.

Step 403 includes: for each of the LSTM cells, inputting the first output corresponding to the LSTM cell, and a second output of the LSTM cell corresponding to the last stage prior to the stage corresponding to the LSTM cell, into the LSTM cell to output a second output.

In some embodiments, for each piece of the first motion information collected at the time point of each stage, inputting the first output of the piece, the second output of the LSTM portion corresponding to the last time point prior to the time point for collecting the piece, and the second output of the LSTM portion corresponding to the last time point of the last stage prior to the stage for collecting the piece, to the LSTM portion to acquire the second output of the piece.

Step 404 includes: using the second output of the LSTM cell corresponding to each of the N stages as the model output to control the machine.

In some embodiments, the second output is an output of the LSTM portion of the LSTM cell corresponding to the last time point of the stage.

Figure 5:
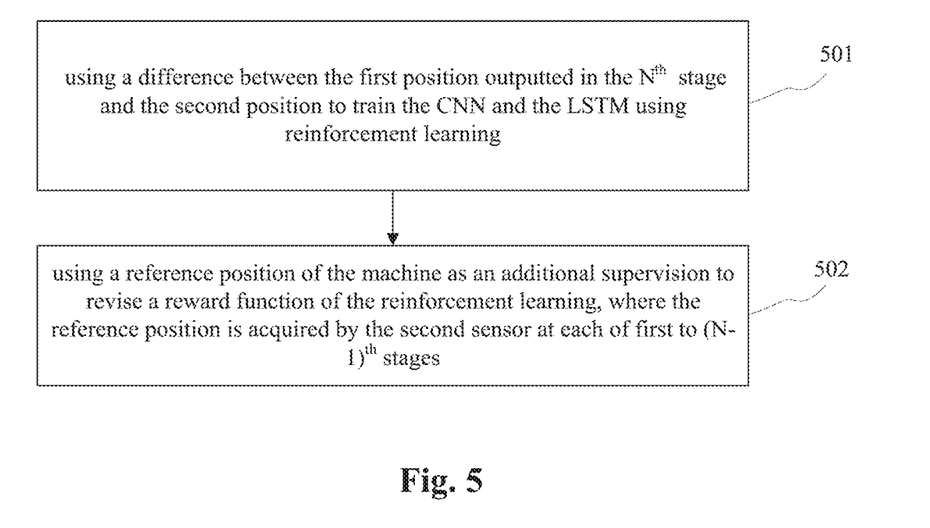
FIG. 5 is a flow chart of a method for training a deep learning model according to some embodiments of the disclosure.

FIG. 5 is a flow chart of a method for training a deep leaning model shown in FIG. 2.

In some embodiments, the model output is a first position of the machine, and second motion information is a second position of the machine collected by the second sensor at $N^{th}$ stage. The method includes steps 501 and 502.

Step 501 includes using a difference between the first position outputted in the $N^{th}$ stage and the second position to train the deep learning model using reinforcement learning.

Step 502 includes using a reference position of the machine as an additional supervision to revise a reward function of the reinforcement learning. In some embodiments, the reference position is acquired by the second sensor at each of first to $(N-1)^{th}$ stages.

Figure 6:
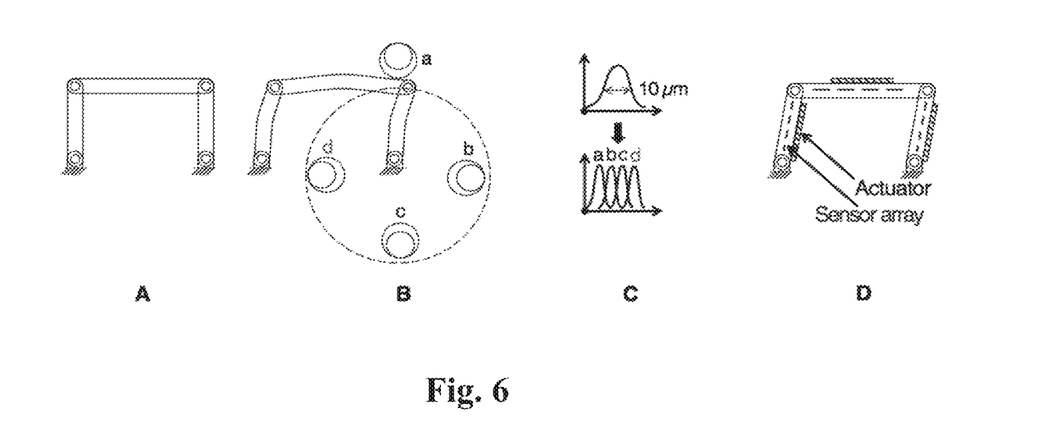
FIG. 6 is a schematic diagram illustrating an application scenario of the control method according to some embodiments of the disclosure.

FIG. 6 is a schematic diagram illustrating an application scenario of the control method according to some embodiments of the disclosure. FIG. 6 shows how repeatability and precision can be improved via sensor arrays and actuators with deep learning algorithm. FIG. 6A shows a four-bar mechanism; FIG. 6B shows the four-bar mechanism under operation with loads (beams are deformed); FIG. 6C shows overall repeatability of a pin joint (top) vs. repeatability of a pin joint at each corresponding location (a, b, c or d) with given load and speed (bottom); and FIG. 6D shows the four-bar mechanism with integrated low-cost sensor arrays (e.g. strain gauges) and actuators (e.g. piezoelectric actuators) for strain/position measurement and error compensation via deep learn principles.

In the application scenario shown in FIG. 6, the four-bar mechanism with revolute (pin) joints and flexible links is used to illustrate how the deep learning model to improve the precision. Pin joints are known to have low repeatability (e.g., σ is 100 μm to 10 μm, σ being standard deviation), arising from the gaps between the pin and hole, and in some embodiments, the gaps are filled with lubricants. The repeatability further worsens when the mechanism is running at high speeds under loads. Because the links are flexible, the deformation of the links affects the node trajectory. Considering the pin joints, although the position repeatability along the circular path is low, the position repeatability can be improved if the data is collected only at specific loads, speeds, and locations (a, b, c, or d). In some embodiments, the precise node position is measured by two high-resolution non-contact displacement sensors (e.g., laser interferometers). Then, low-cost sensor arrays (e.g., strain gauges) and actuators are installed to each link, which record the strain along the beam in real time; and with the guidance of the deep learning model, the processing system drives the actuators to compensate the position errors as the four-bar mechanism moves around, achieving improved precision and repeatability. It should be noted that though the strain gauges do not measure the displacement directly, the strain gauges provide the sensitivity to detect nanometer scale motions/beam deflections.

FIG. 7 is a schematic diagram illustrating another application scenario of the control method according to some embodiments of the disclosure.

Figure 7A:
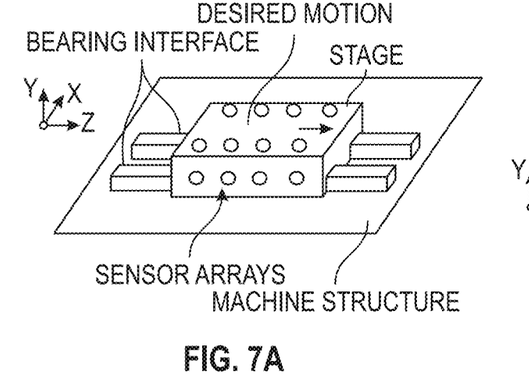
FIG. 7 is a schematic diagram illustrating another application scenario of the control method according to some embodiments of the disclosure.
Figure 7B:
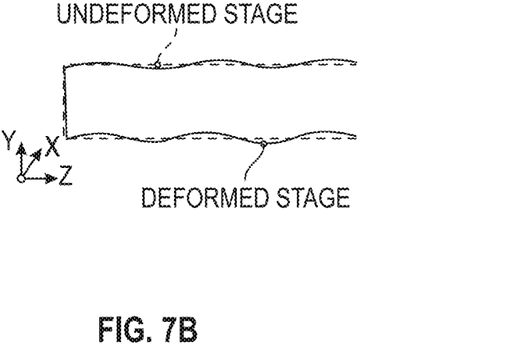

A key subsystem of manufacturing equipment is positioning stages to which other machine systems (e.g. robotic grippers) and product components (e.g. wafers) are attached. FIG. 7A shows a generic long-range linear stage, on which dots indicate locations of strain gauges, and FIG. 7B shows deformations of the long-range linear stage during operation. In some embodiments, the reference positions of the long-range linear stage are measured by laser interferometers (10 nm precision) during operation and training. The data from the strain sensors are sent to deep learning models as 2-D images for processing to predict stage deformations.

To achieve high precision, it is important that a stage retain its geometry during use otherwise anything attached to the stage may be deformed and yield substandard parts. As the speed of operations increases, more force is required to actuate and accelerate stages and high inertial loads occur. The high inertial loads are to some extent deterministic, but cannot always be known accurately enough to predict stage deformations (in the direction of motion and in the other 5 degrees of freedom) at the nanometer-level. Ideally, these stages do not deform in non-predictable ways; however, in practice the effects of high accelerations and nonlinearities in the machine design (e.g., bolted joints) lead to deformations of stage geometry, even when stages are made large. As such, high-force actuators (e.g. piezoelectric actuators) may be integrated into the linear stages (which typically have lower passive stiffness) to achieve high acceleration and deformation compensation; the processing system can learn how a grid of points on the stages' surfaces deform while they are run through a "sweep" of operational parameters (speed, acceleration, loads etc.). The resulting dataset enable machines to minimize their stage errors at low cost.

Figure 8A:
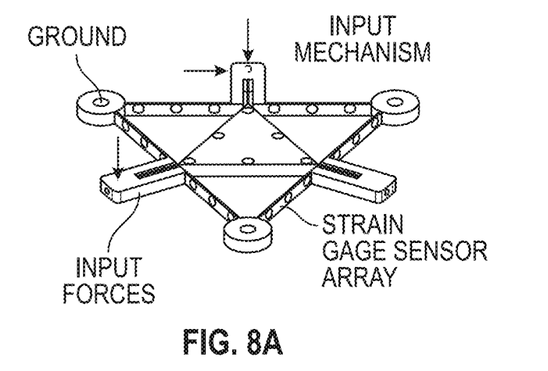
FIG. 8 is a schematic diagram illustrating other application scenarios of the control method according to some embodiments of the disclosure.
Figure 8B:
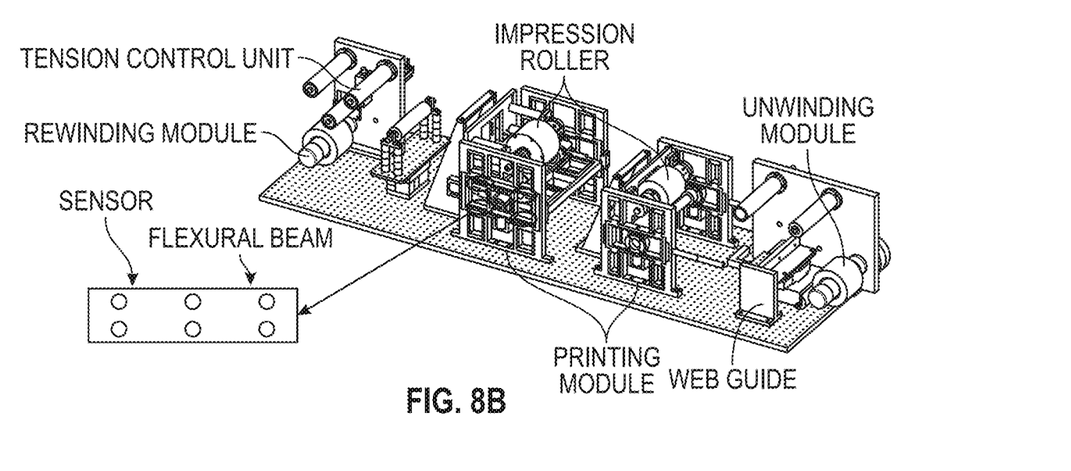
Figure 8C:
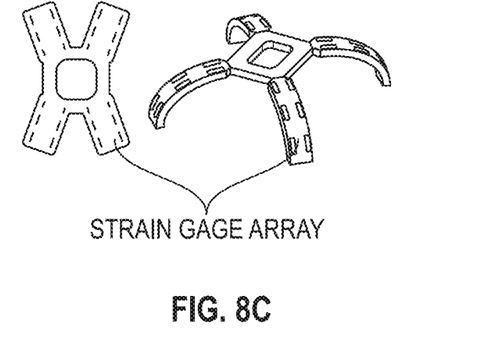

FIG. 8 is a schematic diagram illustrating other application scenarios of the control method according to some embodiments of the disclosure. FIG. 8A shows a six-axis compliant positioner (HexFlex); FIG. 8B shows a flexure-based roll-to-roll printing system; and FIG. 8C shows a four legged soft robot. In FIG. 8, the dots/stripes in the figures indicate the locations of sensor arrays.

Flexures or compliant mechanisms are frequently used for precision positioning and robotic applications. Compliant mechanisms can generate smooth and controlled motion with nanometer level repeatability via the compliance of the materials. Flexures or compliant mechanisms have numerous advantages over traditional mechanical linkages/joints for precision motion guidance, which include reduction of wear between joint members, free of backlash and hysteresis etc. Although the cost of fabricating compliant systems is low, e.g., water jet, expensive position sensors (e.g., capacitance probes ~$10,000; 5 nm precision), actuators and data acquisition systems are required to achieve submicron level precision via closed-loop control. In FIG. 8, multiple examples are shown to demonstrate how sensor arrays are on flexure systems. FIG. 8A presents HexFlex (a planar six-axis compliant mechanism), HexFlex is first developed to manipulate fiber-optics with 10 nm precision and 1×1×1 mm³ work volume. FIG. 8B presents a flexure-based roll to roll (R2R) system that enables continuous multi-layer printing with 100 nm registration precision, where two monolithic XY stages support the two ends of the print rollers guided by air bearings. To adjust the lateral motion for realizing multi-layer printing, one of the print rollers is guided by a single-axis flexure stage (in the left printing module). In FIGS. 8 A and 8B, the flexures are driven by voice coil actuators (e.g., NCC03-15-050-2X motor manufactured by H2 W technologies), and the dots indicate the recommended locations of sensors, e.g., strain gauges, which measure the strain in all three axes. Using a 24 bit data acquisition system, the minimum detectable strain is $-3\times10^{-9}$, making the smallest detectable motion of the center stage (10 nm). The reference positions of the system are provided by measurements of capacitance probes. The data from the strain sensors are sent to the deep learning model as a time sequence or 2-D image for processing. It should be noted that the sensor array not only provides the position of the compliant system, but also the structural deformation and mode shapes under dynamic operation, which no current sensing systems can provide.

In some embodiments, the control method is used in robotic systems and platforms. FIG. 8C presents a four-legged soft robot with recommended location of sensor array installation. Soft robots, i.e., robots consist of soft, flexible, or deformable members, have attracted much attention in recent years due to their advantages in (1) coping with highly dynamic tasks and rough environments, (2) interacting with human bodies or even living cells safely, and (3) reducing cost comparing with metal-based traditional robotic systems. However, most soft robots are plagued by the lack of precision and difficulties in modeling and control versus rigid robots; and the issue may be addressed through the control system and control method according to the embodiments of the disclosure.

FIG. 9 illustrates images for the application scenarios shown in FIG. 8 according to some embodiments of the disclosure.

As shown in FIG. 9, custom-built systems for experiments are provided: FIG. 9A showing a six-axis compliant positioner; FIG. 9B showing a flexure-based roll-to-roll printing system; and FIG. 9C showing a four legged soft robot; and FIG. 9D showing positions of strain gauges attached on the six-axis system in A.

Figure 9A:
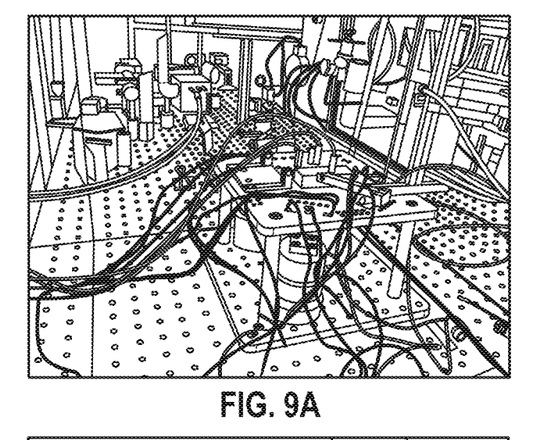
FIG. 9 illustrates images for the application scenarios shown in FIG. 8 according to some embodiments of the disclosure.
Figure 9B:
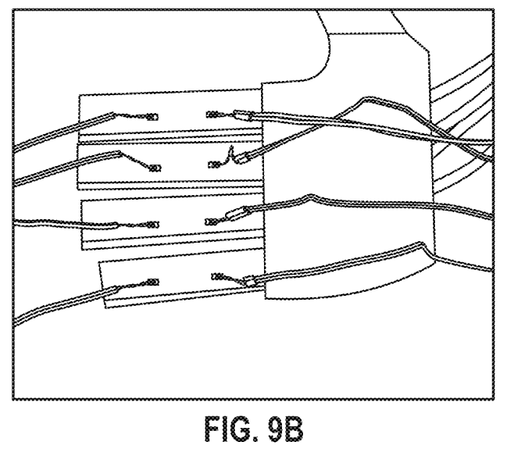
Figure 9C:
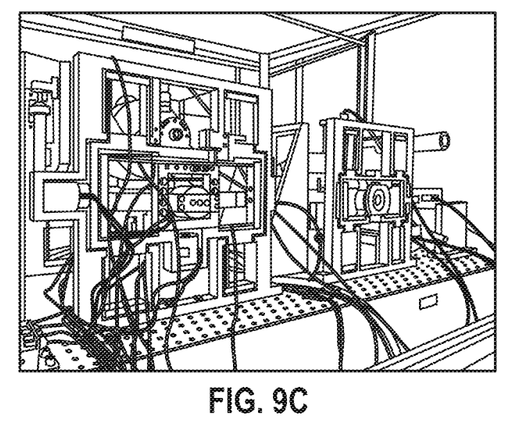
Figure 9D:
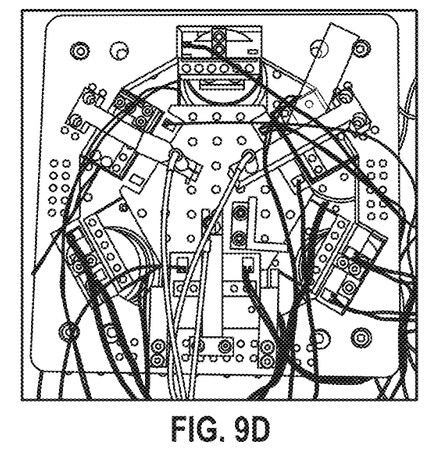
Figure 10A:
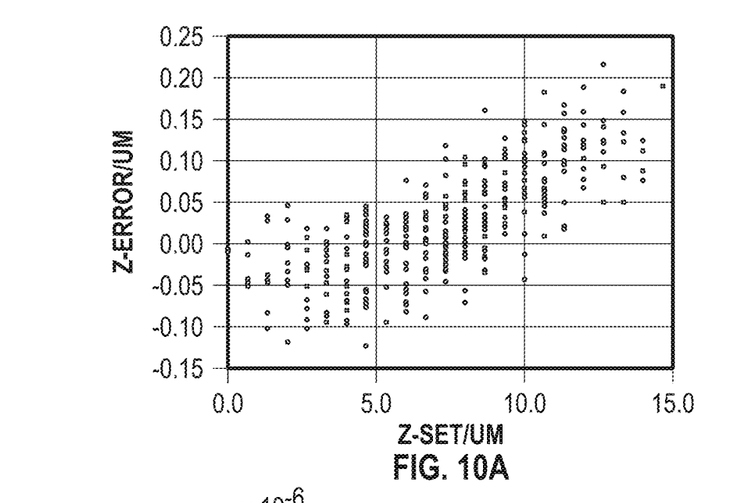
FIG. 10 is a testing result of an application scenario shown in FIG. 9 according to some embodiments of the disclosure.
Figure 10B:
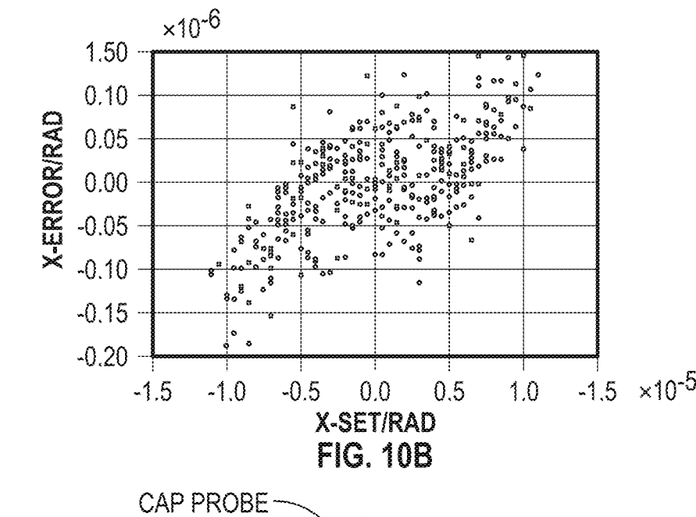
Figure 10C:
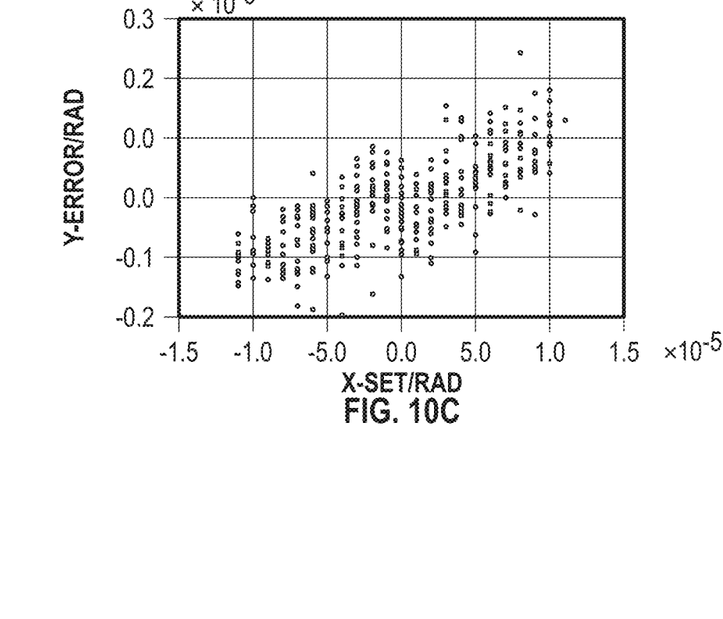
Figure 10D:
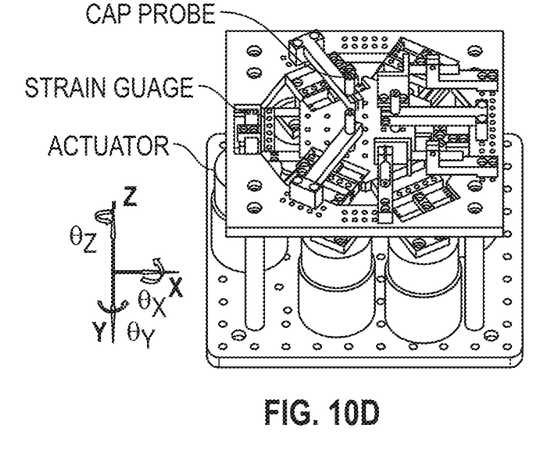

The control method according to the embodiments of the disclosure is experimentally verified on three different platforms including the compliant six-axis positioner, the flexure-based roll-to-roll (R2R) printing system, and the soft robot, as shown in FIGS. 9A, 9B and 9C respectively. In general, strain gauges are uniformly attached at flexing positions with higher strains when the machine operates. FIG. 9D presents a top view of the six-axis stage illustrating the location (e.g., P1, P2 and P3) of the cap probes (the reference sensor). In some embodiments, for symmetric or axisymmetric mechanisms, sensors are not placed at mirroring or symmetric position as the sensors contain similar or redundant information.

FIG. 10 is a testing result of an application scenario shown in FIG. 8 according to some embodiments of the disclosure.

FIG. 10 shows test errors in different axes of the six-axis stage: FIG. 10A showing test errors in Z-axis; FIG. 9B showing test errors in $\theta_x$-axis; and FIG. 9C showing test errors in $\theta_y$-axis; and FIG. 9D showing the 3-D model of six-axis system. The shift of the error shows that the error can be reduced further after model being improved.

As shown in FIG. 10, the test errors are lowered to 200 nm in X, Y, Z axis and $0.10\times10^{-6}$ rad in $\theta_x$, $\theta_y$, $\theta_z$ axis. With physics-guided deep learning model, the system can be controlled dynamically using strain signals as input. Compared with Proportional-Integral-Derivative (PID) control, the control method can enhance the response speed significantly without high precision sensors.

According to the embodiments of the disclosure, a control system and a control method are provided to achieve high precision control via deep learning models and low-cost sensor arrays, e.g., strain sensors. The control system is established by installing low-cost sensor arrays (or additional actuators) at the machine/robot to enable deep learning algorithms to learn and predict the machine behavior as a time sequence or two-dimensional images. At the training stage, high-precision high-cost sensors are used as references to minimize position errors; and the number and location of sensor arrays and actuators can be optimized via the deep learning model. After the training stage, the high-precision high-cost sensors are removed; and the machines are operated and controlled via the deep learning model and sensor arrays. The sensor array (e.g. strain sensor) can achieve 10 nm precision and simultaneously monitor tens to hundreds of nodes on the machine/robots, leading to more informed (e.g., mode shapes) and efficient control output. The system can be applied to various machine tools, compliant mechanisms, and robotic platforms, realizing low-cost high-precision manufacturing. Instead of being treated as a black box, the design of the deep learning models is integrated with the physical models of the machine tools to improve the efficiency and precision, achieving 10 nanometer to submicron level precision through effectively combining the deterministic and statistical approaches.

According to the embodiments of the disclosure, on any robotic or complaint platforms, high-resolution high-cost sensors, e.g., capacitance probes, simultaneously measure data with the sensor arrays under various load and positioning conditions. The data from the high-cost sensor then served as the reference data. For example, 10,000 to 50,000 data pairs can be collected for each machine/platform to train the deep learning model, which consists of 8 to 16 layers of CNN. As analytic models cannot capture all physical phenomena, e.g., non-ideal boundary conditions, manufacturing errors, thermal errors etc., deep learning models are evolved to fill the gap between the engineering model and reference data. Next, the dataset can coach the deep model so that it precisely predicts the position and dynamic behavior of the system. At the testing stage, all the high-cost sensors will be removed and only the low-cost sensor array is used to predict control. Lastly, an optimization process can be employed to guide the training of more compact networks, and remove redundant sensors without sacrificing the control precision via knowledge distilling.

With the control system and the control method, precision control via low cost sensor arrays and deep learning model is achieved and can be broadly adopted to different mechanical platforms. In the past, high resolution sensors used in precision manipulators are expensive (e.g., US$6,000 per channel/axis); in comparison, the strain sensor only costs (US$5 per channel) and an entire array will cost less than US$1,000; yet, achieving superior performance, i.e., equal precision, better control, and dynamic information (mode shapes).

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A control system, comprising
a processor; and
a memory coupled to the processor to store instructions, the instructions when executed by the processor, causing the processor to perform operations, the operations comprising:
receiving first motion information of a machine, the first motion information being acquired by a first sensor, the receiving the first motion information of the machine comprising: collecting T pieces of the first motion information at T time points included in each of N stages respectively, a time interval between every two consecutive stages of the N stages being $\Delta T$, N being an integer greater than 1, $\Delta T$ being a non-zero number, and T being an integer greater than 1;
inputting the first motion information into a deep learning model to obtain a model output, the deep learning model comprising a convolutional neural network (CNN) and a long short-term memory (LSTM), the deep learning model being trained using the first motion information and second motion information of the machine acquired by a second sensor, and the first sensor and the second sensor having different ways of detecting information and processing the detected information; and
using the model output to control the machine.

2. The control system of claim 1, wherein the model output is a first state of the machine, the second motion information is a second state of the machine, and a difference between the first state and the second state is used to train the deep learning model using reinforcement learning.

3. The control system of claim 1, wherein, the CNN comprises N sub-CNNs corresponding to the N stages respectively, and the LSTM comprises N LSTM cells corresponding to the N stages respectively, wherein each of the sub-CNNs is configured to receive T pieces of the first motion information collected at the T time points in the corresponding stage and output a first output; and each of the LSTM cells is configured to receive the first output of the sub-CNN corresponding to the each LSTM cell, and a second output of the LSTM cell corresponding to the last stage prior to the stage corresponding to the each LSTM cell, and to output a second output,
wherein the inputting the first motion information into a deep learning model to obtain a model output comprises:
inputting, for each of the N stages, the T pieces of the first motion information collected at the T time points into the corresponding sub-CNN to acquire the first output; and
for each of the LSTM cells, inputting the first output corresponding to the each LSTM, and a second output of the LSTM cell corresponding to the last stage prior to the stage corresponding to the each LSTM, into the each LSTM cell to output the second output,
wherein the using the model output to control the machine comprises:
using the second output of the each LSTM cell as the model output to control the machine.

4. The control system of claim 3, wherein each of the second outputs corresponding to the N stages is a first position of the machine, the second motion information is a second position of the machine collected at the $N^{th}$ stage by the second sensor, and a difference between the first position outputted in the $N^{th}$ stage and the second position is used to train the CNN and LSTM using reinforcement learning.

5. The control system of claim 4, wherein the operations further comprise: using a reference position of the machine as an additional supervision to revise a reward function of the reinforcement learning, wherein the reference position is acquired at each of first to $(N-1)^{th}$ stages by the second sensor.

6. The control system of claim 1, wherein the system further comprises:
the first sensor;
the second sensor; and
an actuator configured to move the machine according to the model output.

7. The control system of claim 1, wherein the system further comprises:
an array of the first sensors, wherein the first sensors are distributed over a moving or flexing part of the machine such that each of the first sensors emulates a pixel in an image of the machine; and
actuators configured to move the machine according to the model output.

8. The control system of claim 7, the first sensors are arranged at the flexing part of the machine, the flexing part having higher strains when the machine operates.

9. The control system of claim 1, wherein the deep learning model further comprises a physical model established based on physical knowledge, and the operations further comprise inputting an output of the physical model to the CNN.

10. The control system of claim 1, wherein the deep learning model further comprises a physical model established based on physical knowledge, and the method further comprises using an output of the physical model as a supervision for training the CNN and LSTM.

11. A computer-implemented control method, the method comprising:
receiving first motion information of a machine, the first motion information being acquired by a first sensor, the receiving the first motion information of the machine comprising: collecting T pieces of the first motion information at T time points included in each of N stages respectively, a time interval between every two consecutive stages of the N stages being $\Delta T$, N being an integer greater than 1, $\Delta T$ being a non-zero number, and T being an integer greater than 1;
inputting the first motion information into a deep learning model to obtain a model output, the deep learning model comprising a convolutional neural network (CNN) and a long short-term memory (LSTM), the deep learning model being trained using the first motion information and second motion information of the machine acquired by a second sensor, and the first sensor and the second sensor having different ways of detecting information and processing the detected information; and
using the model output to control the machine.

12. The method of claim 11, wherein the model output is a first state of the machine, and the second motion information is a second state of the machine, a difference between the first state and the second state is used to train the deep learning model.

13. The method of claim 11, wherein, the CNN comprises N sub-CNNs corresponding to the N stages respectively, and the LSTM comprises N LSTM cells corresponding to the N stages respectively, wherein each of the sub-CNNs is configured to receive T pieces of the first motion information collected at the T time points in the corresponding stage and output a first output; and each of the LSTM cells is configured to receive the first output of the CNN corresponding to the each LSTM cell, and a second output of the LSTM cell corresponding to the last stage prior to the stage corresponding to the each LSTM cell, and to output a second output,
wherein the inputting the first motion information into a deep learning model to obtain a model output comprises:
inputting, for each of the N stages, the T pieces of the first motion information collected at the T time points into the corresponding sub-CNN to acquire the first output; and
for each of the LSTM cells, inputting the first output corresponding to the each LSTM, and a second output of the LSTM cell corresponding to the last stage prior to the stage corresponding to the each LSTM, into the each LSTM cell to output the second output,
wherein the using the model output to control the machine comprises:
using the second output of the each LSTM cell as the model output to control the machine.

14. The method of claim 13, wherein each of the second outputs corresponding to the N stages is a first position of the machine, the second motion information is a second position of the machine collected at the $N^{th}$ stage by the second sensor, and a difference between the first position outputted in the $N^{th}$ stage and the second position is used to train the CNN and LSTM using reinforcement learning.

15. The method of claim 14, wherein the method further comprises: using a reference position of the machine as an additional supervision to revise a reward function of the reinforcement learning, wherein the reference position is acquired at each of first to $(N-1)^{th}$ stages by the second sensor.

16. The method of claim 11, wherein the using the model output to control the machine comprises:
moving the machine according to the model output through an actuator.

17. The method of claim 11, wherein the deep learning model further comprises a physical model established based on physical knowledge, and the method further comprises inputting an output of the physical model to the CNN.

18. A non-transitory machine-readable medium having instructions stored therein, which when executed by a processor, cause the processor to perform operations, the operations comprising
receiving first motion information of a machine, the first motion information being acquired by a first sensor, receiving the first motion information of the machine comprising: collecting T pieces of the first motion information at T time points included in each of N stages respectively, a time interval between every two consecutive stages of the N stages being ΔT, N being an integer greater than 1, ΔT being a non-zero number, and T being an integer greater than 1;
inputting the first motion information into a deep learning model to obtain a model output, the deep learning model comprising a convolutional neural network (CNN) and a long short-term memory (LSTM), the deep learning model being trained using the first motion information and second motion information of the machine acquired by a second sensor, and the first sensor and the second sensor having different ways of detecting information and processing the detected information; and
using the model output to control the machine.

* * * * *